United States Patent [19]
Eickmann

[11] 3,803,986
[45] Apr. 16, 1974

[54] ROTARY RADIAL PISTON TYPE FLUID HANDLING DEVICE

[76] Inventor: Karl Eickmann, 2420 Isshiki, Kanagawa, Japan

[22] Filed: Nov. 26, 1971

[21] Appl. No.: 202,516

[52] U.S. Cl. ................................................. 91/492
[51] Int. Cl. ............................................ F01b 3/04
[58] Field of Search ............ 91/491, 492, 498, 484, 91/486, 487

[56] References Cited
UNITED STATES PATENTS

| | | | |
|---|---|---|---|
| 2,800,857 | 7/1957 | Yarmak | 91/492 |
| 3,357,362 | 12/1967 | Orr | 91/492 |
| 1,152,729 | 9/1915 | Hele-Shaw | 60/53 B |
| 3,470,825 | 10/1969 | Gsching | 91/494 |
| 3,223,046 | 12/1965 | Eickman | 91/488 |

*Primary Examiner*—William L. Freeh
*Assistant Examiner*—Gregory P. LaPointe
*Attorney, Agent, or Firm*—Michael S. Striker

[57] ABSTRACT

In a rotary radial piston type fluid handling device, such as a pump, motor, transmission, compressor or engine a shaft is provided with a median bearing portion and coupling means on the ends of said bearing portion while at least two rotary members are borne on said median bearing portion of the shaft and are coupled to the shaft by the coupling means thereof, so that the rotary fluid handling radial piston type members can be easily assembled to said shaft and move relatively to the same in axial direction to a limited extent. A further improvement is provided by forming piston shoe seats on the outer portions of the pistons of the device and embracing the same by pivotably connected piston shoes.

3 Claims, 3 Drawing Figures

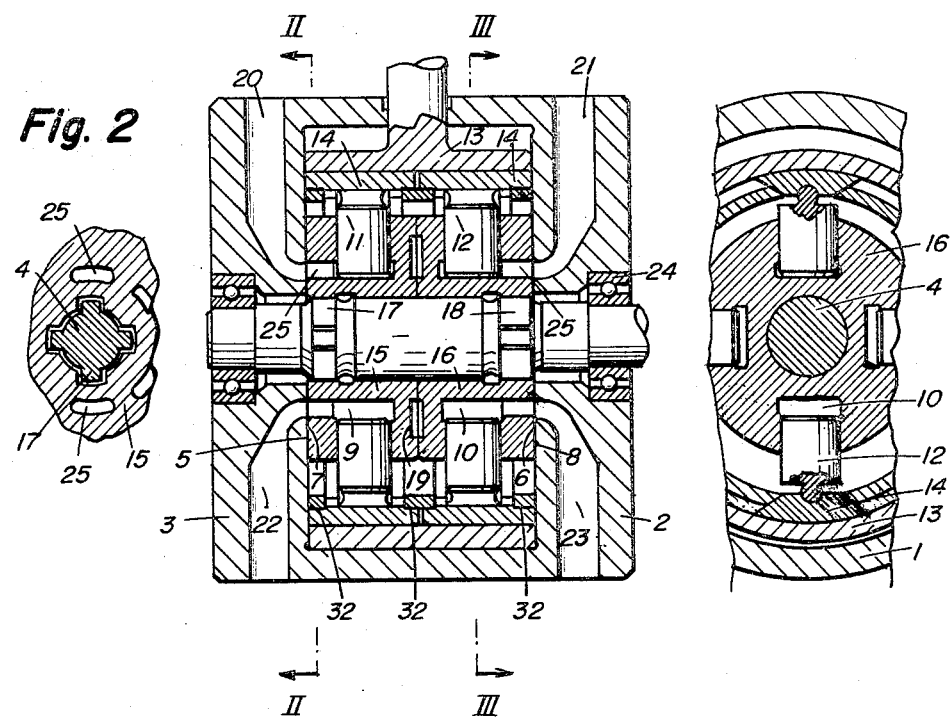

ROTARY RADIAL PISTON TYPE FLUID HANDLING DEVICE

BACKGROUND OF THE INVENTION

In rotary fluid handling devices with radially variable working chambers, like gear pumps, vane pumps, trochoid pumps, radial piston pumps, machines, or motors, for example of the type disclosed in U.S. Pat. No. 3,470,825, it was difficult heretofore, to fasten the fluid handling rotary members on the driving or driven shaft of the machine, because fastening means, like keyways or splines would disturb the control face portion or cause the necessity of larger inner diameters of the control faces, which in turn would then cause greater control faces and thereby greater friction between control faces of the machine. These drawbacks restricted the efficiency of such machines and their power. One of the worst difficulties in heretofore known fluid handling devices was that the shaft deformed under the heavy radial load, and that the rotary control faces were not entirely parallel to and floating adjacent the stationary control faces of the devices. This resulted in wearing and friction at certain portions of the control clearances and in high leakage at higher pressures at other portions of the control clearances on the axial ends of the fluid handling rotary members.

SUMMARY OF THE INVENTION

It is the main object of this invention to overcome those drawbacks.

The object of this invention is met by by the invention in that a shaft bears at least two rotary members thereon, whereof at last one is a fluid handling body sliding with a rotary control face along the stationary control face of a cover of the machine or a member thereof and defining therewith the control clearance between said control faces. The shaft is provided with a median bearing portion of a bigger diameter for bearing the said rotary members thereon, and on the ends of the median bearing portion clutching means are provided on smaller diameter portions of said shaft for clutching or coupling the rotor members to said shaft. The rotor members are provided with respective clutch portions or coupling portions radially inward of the rotary control faces of said rotary members for association with said clutching or coupling members or portions of said shaft. Thus, the rotary members are moved lengthwise of the shaft from the axial ends thereof, clutch into the clutching portions and are entrained thereby for rotation in unison with the shaft. The clutching or coupling means allow an axial movement of the rotary members relatively to the shaft, so that the rotary members can easily engage the stationary control faces of the device.

In keeping with another object of the invention, the rotary members of the device are inserted and kept between two innermost control faces of cover means of the device, thereby forming close clearances between the end faces of the rotary members and the said innermost control faces. The bearing portions of the shaft are so configurated that radial deflection of the shaft is prevented and a small spherical movement of the rotary members is assured, while a definite axial freedom of movement of the rotary members is maintained. The rotary control faces of the rotary members are therefore able, due to the invention, to slide tightly along the stationary control faces of the device with less friction and to seal thereagainst.

The provision of the larger diameter median bearing portion on the shaft realizes another object of the invention, which is, to prevent deflection of the shaft and resulting inclination of the rotary members and their rotary control faces.

Another object of the invention, which is to provide the smallest possible rotary and stationary control faces for assuring little leakage and little friction therebetween to thereby increase the volumetric and total efficiency of the machine, is realized in that the clutching or coupling portions or members of the invention are made of smaller diameter than the median bearing portion of the shaft, so that control faces of small diameters can be formed adjacent the said clutching or coupling means or members.

A still further object of the invention is to provide a fluid handling device which is easy to manufacture and inexpensive in production but at the same time avoids the need for additional universal joint type mounting means. This object is achieved in that key means constitute the clutching or coupling means of the shaft and rotary members. Such key means are commonly spline means because they are easy to manufacture and, since they are integral with the shaft or the rotary members, cannot disassemble and fall off.

Another object of the invention is to provide piston shoe seats in pistons of a simple configuration, and pistons shoes with piston shoe seats, which embrace the piston shoe seat of the associated piston and which allow a pivoting of the piston shoe relative to the piston, while at the same time an axial moveability between the pistons and piston shoes is assured. Guide means may be added or associated to the piston shoes in order to guide their movement or in order to actuate their and the pistons' radial movements. According to this object of the invention the piston head is formed part cylindrical with an axis normal to the axis of the piston and the piston shoe embraces the piston head over more than 180 degrees, so that the piston shoe can not fall off from the associated piston.

BRIEF DESCRIPTION OF THE DRAWING

For a fuller understanding of the invention a typical embodiment thereof is illustrated in the accompanying drawing, wherein FIG. 1 is a longitudinal sectional view through a preferred embodiment of the invention;

FIG. 2 is a fragmentary crossectional view through FIG. 1 along the line II — II; and FIG. 3 is a fragmentary crossectional view through FIG. 1 along the line III — III.

In FIGS. 1 to 3 numeral 1 designates the housing, and numerals 2 and 3 show the covers of the housing of the machine according to the invention. Controlfaces 5 and 6 are provided inwardly on the respective covers 2 and 3. These controlfaces are the stationary controlfaces. Fluid passages 20 and 22 extend through cover 3 and form control ports therein, which extend through controlface 5, while fluid passages 21 and 23 extend through cover 3 and form controlports therein, which extend through controlface 6. In the covers 2 and 3 bearings 24 are provied wherein the driving or driven shaft 4 is rotatably journalled. Shaft 4 is provided with entraining means in form of a key or spline 17 on one portion of shaft 4 and with a respective other entraining means means 13 on another portion of shaft 4. Entraining means in this case shall mean, that the entraining means entrains one or more members for rotation in unison with shaft 4, or vice versa. Between the entraining means 17 and 18 is located a larger diameter portion of shaft 4 which is preferably circular for bearing respective rotor members or piston blocks 15 and 16 thereon. According to the invention, there is not one rotor, but there are two rotor members 15 and 16. Each member 15 and 16 is provided with a hub which forms a seat suitable to be supported on the median portion of shaft 4 and endwards of the respective hub there is provided a coupling portion which mates with the entraining means 17 or 18, respectively. The members 15 and 16 are moved axially of the shaft 4 until each member 15 or 16 engages with the entraining means 17 or 18 and is supported on the median portion of shaft 4 between the entraining means 17 and 18. Members 15 and 16 are now in abutment with one another and one or more spaces may be formed between them, for example as shown by numeral 19. The axially outer ends of members 15 and 16 are provided with respective plane or otherwise, for example conical or spherical end faces 7 and 8 which constitute rotary control faces. Said rotary controlfaces are each juxtaposed with and slide along the neighboring stationary controlface, for example on rotary controlface 7 along stationary controlface 5 and rotary controlface 8 along the stationary controlface 6. Member 15 is provided with working chambers 9, whereto the rotorpassages 25 lead. Rotorpassages 25 each extend from a respective working chamber in the respective member 15 or 16 through a portion thereof into and through the respective rotary control face 7 or 8. Displacement elements 11 are provided in the working chambers 9 of member 15 and displacement elements 12 are provided in member 16. The displacement elements 11 and 12 are in this embodiment of the invention provided with displacement guideshoes 14. Displacement actuator means 13 is provided for guiding the displacement guideshoes and thereby the displacement elements 11 and 12 inwardly and outwardly of respective working chambers 9 or 10. Thus, fluid is suctioned into working chambers 9 through passage 20 or 22 and the respective controlports and rotorpassages 25, when the displacement elements 11 move outward in chambers 9, and the fluid expelled from said chambers 9 in the opposite flow direction when the displacement elements 11 move inwards in the working chambers 9. Fluid is intaken into working chambers 10 when displacement elements 12 move outwards in said chamber 10 through passage 21 or 23 and the respective controlport thereof and through the respective rotorpassages 25, and fluid is expelled out of the respective working chamber 10, when the respective displacement element 12 moves inwards in said respective chamber or chambers. The flow direction is thereby reversed. Thrust means, fluid containing chambers or other chambers, springs, or the like, which are designated by numeral 19 may be provided between the members 15 and 16 and/or extend into one or both of them. The thickness of the members 15 and 16 in axial direction is preferably so dimensioned that the members 15 and 16, if in abutment with each other at their adjacent endfaces, just fit with a suitable clearance for operation between the stationary controlfaces 5 and 6 of housing covers 2 and 3. The members 15 and 16 are axially moveable relative to shaft 4, but are prevented from relative rotational movement with reference to shaft 4. They therefore revolve in unison with shaft 4, while they can axially move, for reduced friction floating with their end faces, i.e. the rotary controlfaces 7 and 8 between the stationary controlfaces 5 and 6. The latter stationary control faces may also be provided on separate control bodies if they are not directly provied on the covers 2 or 3. If the distance between the stationary controlfaces 5 and 6 is larger than the sum of the axial thicknesses of the members 15 and 16, then the thrust means 19 between rotor-members 15 and 16 are provided for pressing the respective members 15 or 16 in axially outward direction to obtain close engagement of the rotary controlfaces 7 and 8 with the stationary controlfaces 5 and 6. This is possible because of the axial moveability of both members 15 and 16. Leakage between the controlfaces 5 and 7 and 6 and 8 is thereby reduced to a minimum and thrusts or vibrations of blows onto shaft 4 from outside are not transferred from the shaft 4 to the members 15, 16, because the latter are axially on the shaft 4. At same time the thicker portion of shaft 4 between the entraining means 17 and 18 provides large radial bearing force for bearing the highly loaded members 15 and 16 strongly on shaft 4. Thus the machine of the embodiment of FIGS. 1 to 3 is a fluidhandling device, for example, pump or rotor, of high pressure capability, high reliability, simplicity and safety, which prevents friction between its stationary and rotary controlfaces.

The pistons of the radial piston type fluid handling device of FIGS. 2 and 3 are provided with piston heads for connection of piston shoes which are pivotable to the pistons. The piston heads of pistons 11 and 12 are formed part-cylindrical around an axis normal to the axis of the piston. The part cylindrical configuration extends with equal radius around the axis of the piston head for more than 180 degrees, so that a narrow piston neck is formed between the piston and the piston head. The said piston neck is narrower than the piston head, because the part-cylindrical configuration extends more than 180 degrees. The piston shoes 14 have a piston shoe seat, which is formed corresponding to the piston head for embracing the piston head over more than 180 degrees. The axis of the piston shoe seat is the same as that of the respective piston head. Said axes are parallel to the axis of the rotor and shaft of the device. An only very small clearance is formed between the piston shoe seat and the piston head, so that the piston shoe can pivot around the piston head axis to the desired extent. The piston neck is narrowed for allowing the piston shoe to pivot to the desired extent.

Guide rings 32 may be associated to the piston shoes 14 for guiding the same. The piston shoes 14 and guide rings 32 may be provided with guide faces for guiding the radial outward movement of the piston shoes, thereby also entraining the pistons 11 and 12 in outward direction. The guide rings 32 and piston shoes 14 may also have further guide faces for preventing the piston shoes from undesired axial displacement.

This piston-piston shoe arrangement is easy to be manufacture and reliable in operation, because it allows pivotable and axial freedom of the piston shoes 14 and at the same time assures that the pistons 11 or 12 and the respective piston shoe 14 remain connected together at all times.

I claim:

1. In a fluid handling machine of the type having a housing, a plurality of radial piston blocks within the housing and a shaft extending through the blocks and secured thereto for rotation therewith, the improvement which consists in that said shaft comprises a larger-diameter cylindrical median portion provided in said housing and two smaller-diameter coupling portions flanking said median portion, that one of said piston blocks has a cylindrical internal surface seated on a first part of said median portion and first complementary coupling means mating with one of said smaller-diameter coupling portions, and that another of said piston blocks has a cylindrical internal surface seated on a second part of said cylindrical median portion and second complementary coupling means mating with the other of said smaller-diameter coupling portions.

2. The improvement as defined in claim 1, wherein at least one of said coupling portions and the corresponding complementary coupling means comprise interdigitated axially parallel splines so that the respective block is movable axially of said shaft.

3. The improvement as defined in claim 1, wherein said housing has internal sealing surfaces including portions closely adjacent to said coupling portions and each of said piston blocks has a complementary sealing surface engaging said portion of one of said internal sealing surfaces.

* * * * *